United States Patent
Gao et al.

(10) Patent No.: US 8,452,291 B2
(45) Date of Patent: May 28, 2013

(54) SYSTEM AND METHOD FOR ALTERNATING BETWEEN IN-BAND AND OUT-OF-BAND COMMUNICATION PATH

(75) Inventors: Dapeng Gao, Burnaby (CA); Ximing Zeng, Waterloo (CA); Abhinav Gupta, Los Angeles, CA (US); Alexander Shatsky, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 330 days.

(21) Appl. No.: 12/830,372

(22) Filed: Jul. 5, 2010

(65) Prior Publication Data

US 2011/0189985 A1 Aug. 4, 2011

Related U.S. Application Data

(60) Provisional application No. 61/300,617, filed on Feb. 2, 2010.

(51) Int. Cl.
*H04W 40/00* (2009.01)

(52) U.S. Cl.
USPC ........ 455/445; 455/417; 455/560; 455/554.1; 455/422.1; 370/216; 370/352; 370/356; 370/401; 370/328; 379/211.01; 379/211.02

(58) Field of Classification Search
USPC ...................... 455/445, 417, 428, 560, 422.1; 370/351–356, 401
See application file for complete search history.

(56) References Cited

U.S. PATENT DOCUMENTS

| | | | | |
|---|---|---|---|---|
| 5,463,671 A * | 10/1995 | Marsh et al. | ................. | 379/56.1 |
| 6,108,341 A * | 8/2000 | Christie | ....................... | 370/410 |
| 6,405,033 B1 * | 6/2002 | Kennedy et al. | ........... | 455/414.1 |
| 6,671,510 B1 * | 12/2003 | Kelly et al. | .................... | 455/445 |
| 6,823,184 B1 * | 11/2004 | Nelson | ......................... | 455/418 |
| 6,845,250 B1 * | 1/2005 | Ramalingam | ................. | 455/560 |
| 6,885,872 B2 * | 4/2005 | McCann et al. | ............. | 455/466 |
| 7,139,588 B2 * | 11/2006 | Lee et al. | .................... | 455/552.1 |
| 7,606,571 B2 * | 10/2009 | Lukacs | ......................... | 455/445 |
| 7,684,374 B2 * | 3/2010 | Karaoguz et al. | ............. | 370/338 |
| 7,894,807 B1 * | 2/2011 | Drennan | ....................... | 455/417 |
| 7,953,416 B2 * | 5/2011 | Gonen et al. | ................... | 455/445 |
| 7,974,615 B2 * | 7/2011 | Talty et al. | ................. | 455/422.1 |
| 8,005,070 B2 * | 8/2011 | Marsh et al. | .................. | 370/352 |
| 8,224,307 B2 * | 7/2012 | Ray et al. | ...................... | 455/417 |
| 2007/0281680 A1 | 12/2007 | Raju et al. | | |
| 2009/0257418 A1 | 10/2009 | Allen et al. | | |

FOREIGN PATENT DOCUMENTS

| | | |
|---|---|---|
| EP | 1947868 | 7/2008 |
| EP | 2088739 | 8/2009 |
| WO | 2004082219 | 9/2004 |

OTHER PUBLICATIONS

Extended European Search Report pursuant to Rule 62 EPC dated Nov. 12, 2010.
MERH IP Response to communication pursuant to Rule 62 EPC dated Jan. 12, 2011.

* cited by examiner

*Primary Examiner* — Sharad Rampuria
(74) *Attorney, Agent, or Firm* — Norton Rose Canada LLP

(57) ABSTRACT

Systems, methods and devices are disclosed useful for enabling wireless signals representing control messages to be sent between a wireless handheld telephony device and a call control server during an ongoing communication session when an out-of-band path becomes unavailable, the communication session being controlled by the call control server.

19 Claims, 8 Drawing Sheets

SYSTEM AND METHOD FOR ALTERNATING BETWEEN IN-BAND AND OUT-OF-BAND COMMUNICATION PATH

CROSS-REFERENCE TO RELATED APPLICATIONS

The present application claims priority from U.S. provisional patent application No. 61/300,617, filed Feb. 2, 2010, the entirety of which is hereby incorporated by reference.

FIELD

The present application relates generally to mobile communication devices and, more particularly, to systems and methods for alternating between in-band and out-of-band communications paths during communication sessions.

BACKGROUND

Technology exists for routing communications made from a wireless handheld telephony device through a server, such as an enterprise or other type of call control server. This can be done, for example, to make it appear as if a communication originated from a user's place of business or to prevent a party receiving the communication from accessing the wireless user's wireless number. Using some protocols, such as the Dual Mode Transfer (DTM) protocol, wireless communications may use multiple communications paths, including for example both an audio/voice path for relaying a voice communication and a data path for sending data such as, for example, control information between the server and the wireless handheld telephony device.

For example, a server may send a control command to a wireless handheld telephony device informing it of an incoming communication intended for delivery to the wireless device. Similarly, the wireless handheld telephony device may send a control command to the server, for example, indicating that an incoming communication should be accepted, or requesting that a current communication process be put on hold. Communication which is sent using the same path as voice communications, for example an audio path, may be referred to as in-band communication. Communication through some other means, such as through a data path, may be referred to as out-of-band communication.

A data path, or channel, may be faster and more reliable than an audio path or channel. For this reason, data, such as control commands, would normally be sent via the data path when a data path is available. In some situations, however, the data connection between the wireless handheld telephony device and the server may be lost during an ongoing communication. For example, wireless handheld telephony device may roam to a tower of a wireless network which does support a dual path protocol (i.e. a protocol involving both a data and non-data or audio path), such as 3G protocols (e.g. CDMA2000 1x EV-DO or UTMS), to a tower of a wireless network which does not support the dual path protocol, such as 2G protocols without DTM (e.g. GSM/GPRS). It is also possible for a data path which was previously lost or unavailable to become available, for example, if the wireless handheld telephony device roams to tower or network which supports the dual path protocol.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
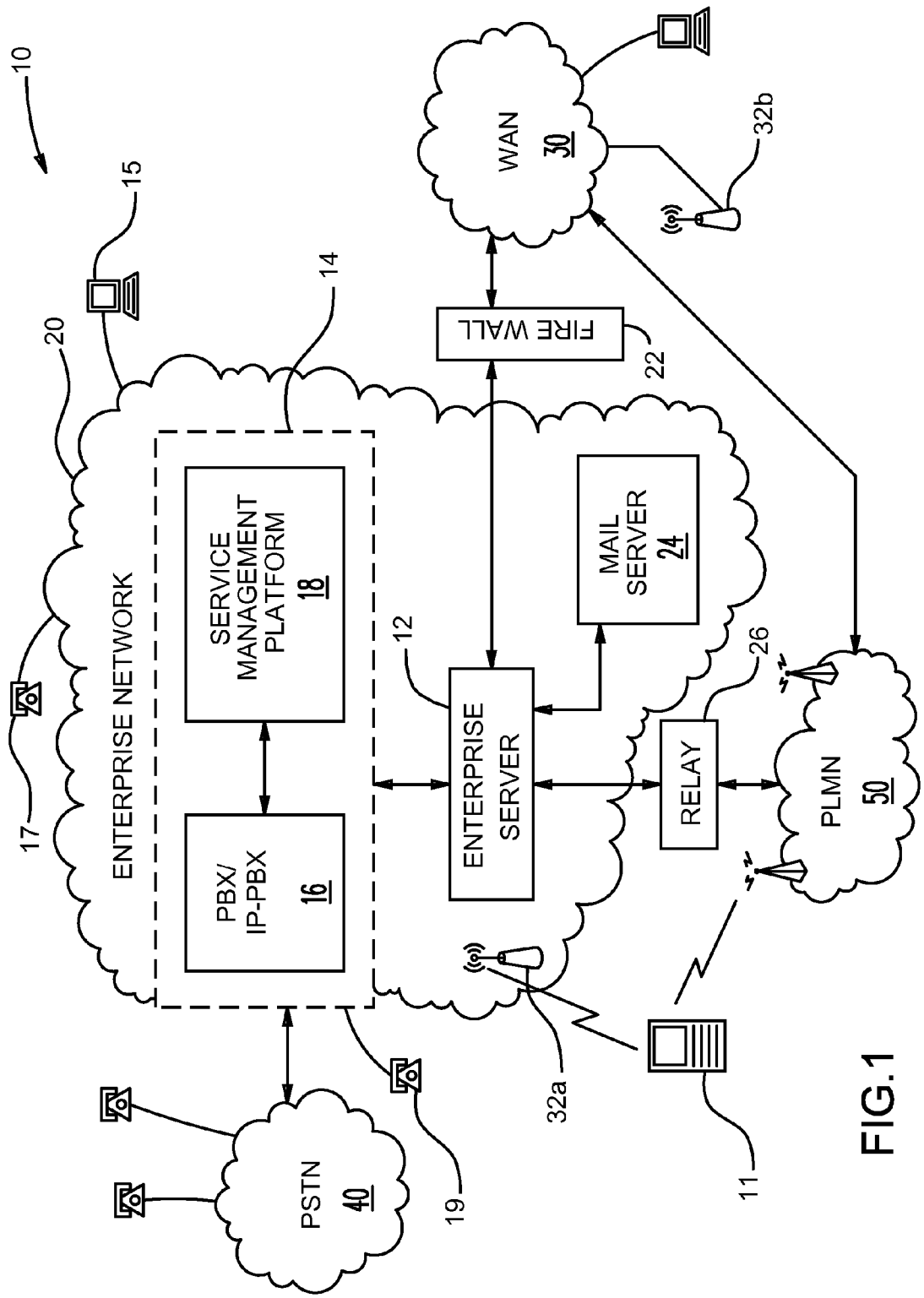
FIG. 1 shows a schematic diagram of an example of a system suitable for managing telephone and other communications in accordance with the disclosure herein.

In some aspects, the present application provides a wireless handheld telephony device comprising at least one wireless signal receiver, at least one wireless signal transmitter, and at least one data processor configured to send and receive wireless signals representing control messages to and from a call control server by: in response to a determination that an out-of-band path to the call control server is available: sending the wireless signals representing control messages through the at least one wireless signal transmitter to the call control server using the out-of-band path; and receiving the wireless signals representing control messages through the at least one wireless signal receiver from the call control server using the out-of-band path; in response to a determination that the out-of-band path to the call control server is unavailable: initiating in-band communication with the call control server using an in-band path; sending the wireless signals representing control messages through the at least one wireless signal transmitter to the call control server using the in-band path; and receiving the wireless signals representing control messages through the at least one wireless signal receiver from the call control server using the in-band path.

In some aspects, the present application provides a method of enabling a wireless handheld telephony device to send and receive wireless signals representing control messages to and from a call control server, the wireless handheld telephony device comprising at least one wireless signal receiver, at least one wireless signal transmitter, at least one data processor, and media readable by the at least one data processor comprising coded program instructions, the method comprising: in response to a determination that an out-of-band path to the call control server is available: sending the wireless signals representing control messages through the at least one wireless signal transmitter to the call control server using the out-of-band path; and receiving the wireless signals representing control messages through the at least one wireless signal receiver from the call control server using the out-of-band path; in response to a determination that the out-of-band path to the call control server is unavailable: initiating in-band communication with the call control server using an in-band path; sending the wireless signals representing control messages through the at least one wireless signal transmitter to the call control server using the in-band path; and receiving the wireless signals representing control messages through the at least one wireless signal receiver from the call control server using the in-band path.

In some aspects, the present application provides a system configured to enable wireless signals representing control messages to be sent and received from a wireless handheld telephony device, the system comprising: a data processor, media readable by the data processor, and a communications subsystem; the communications subsystem adapted to process signals representing communications by and between the wireless handheld telephony device, the second telephony device, and the processor; and the media readable by the data processor comprising coded program instructions adapted to cause the processor to: when an out-of-band path to the wireless handheld telephony device is available: send the wireless signals representing control messages through the at least one wireless signal transmitter to the wireless handheld telephony device using the out-of-band path; and receive the wireless signals representing control messages through the at least one wireless signal receiver from the wireless handheld telephony device using the out-of-band path; when the out-of-band path to the wireless handheld telephony device is unavailable: receive an initiation signal from the wireless handheld telephony device indicating that the out-of-band path is unavailable; send the wireless signals representing control messages through the at least one wireless signal transmitter to the wireless handheld telephony device using the in-band path; and receive the wireless signals representing control messages through the at least one wireless signal receiver from the wireless handheld telephony device using the in-band path.

Other aspects of the present application will be apparent to those of ordinary skill in the art from a review of the following detailed description in conjunction with the drawings.

Embodiments of the present application are not limited to any particular operating system, wireless handheld telephony device architecture, server architecture, or computer programming language.

Reference is now made to FIG. 1, which shows, in block diagram form, an example of a system, generally designated 10, for the control and management of communications, suitable for use in implementing the systems and methods disclosed herein. System 10 includes an enterprise or business communications system 20, which may include a local area network (LAN). In the description below, the enterprise or business system 20 may be referred to as an enterprise network 20. It will be appreciated that the enterprise network 20 may include more than one network and may be located in multiple geographic areas in some embodiments.

Enterprise network 20 may be connected, for example through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

Enterprise network 20 may also communicate with a public land mobile network (PLMN) 50, which may also be referred to as a wireless wide area network (WWAN) or, in some cases, a cellular network. Connection with the PLMN 50 may be made via a relay 26, as known in the art.

Enterprise network 20 may also provide one or more wireless local area networks (WLANs) 32a featuring wireless access points. Other WLANs 32 may exist outside the enterprise network 20. For example, WLAN 32b may be connected to WAN 30.

System 10 may include and/or interact with a number of enterprise-associated mobile devices 11 (only one shown).

Mobile device(s) 11 may include devices equipped for cellular communication through the PLMN 50, mobile devices equipped for Wi-Fi communications over one of the WLANs 32, and/or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in for example any of a variety of known manners, as the user moves. Different PLMNs may have different capabilities and/or support different wireless protocols. For example, some PLMNs may support a dual path protocol, such as DTM, whereas others may not.

In some instances, dual-mode mobile devices 11 and/or enterprise network(s) 20 may advantageously be configured to facilitate roaming between the PLMN 50 and a WLAN 32, and thus capable of seamlessly transferring sessions (such as voice calls) from a connection with the cellular interface of the dual-mode device 11 to the WLAN 32 interface of the dual-mode device 11, and vice versa. A WLAN connection will generally include a data path though the data rate (i.e. the throughput or bandwidth) may vary from a minimum to a maximum supported data rate.

Enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

Enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

Relay 26 serves to route messages received over the PLMN 50 from the mobile device 11 to the corresponding enterprise network 20. The relay 26 also pushes messages from the enterprise network 20 to the mobile device 11 via the PLMN 50.

In the embodiment shown, enterprise network 20 includes an enterprise server 12. Together with relay 26, enterprise server 12 can function to redirect, copy, or relay incoming e-mail messages addressed to a user's e-mail address within enterprise network 20 to the user's mobile device 11 and to relay incoming e-mail messages composed and sent via the mobile device 11 out to the intended recipients within the WAN 30 and/or elsewhere. Among other functions, enterprise server 12 and relay 26 together can facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 can include one or more Private Branch eXchanges (although in various embodiments the PBX(s) may be standard PBX(s) or IP-PBX(s), for simplicity the description below uses the term PBX to refer to both) 16 having a connection with the PSTN 40 for routing incoming and outgoing voice calls to and from digital and/or analog telephones or other telephony devices for the enterprise. The PBX 16 is connected to the PSTN 40 via DID-enabled ISDN/PRI trunks, for example. Direct inward dialing (DID), also called direct dial-in (DDI), is a feature offered by telephone companies for use with their customers' private branch exchange (PBX) systems. In DID service, a service proviser, such as a telephone company may provide one or more trunk lines to a customer for connection to the customer's PBX and may allocate a range of telephone numbers to this line (or group of lines) and forward all calls to such numbers via the trunk. As calls are presented to the PBX, the dialed destination number (DNIS) may be transmitted, possibly partially (e.g., last four digits), so that the PBX can route the call directly to the desired telephone extension within the organization without the need for an operator or attendant. The service allows direct inward call routing to each extension while maintaining only a limited number of subscriber lines to satisfy the average concurrent usage of the customer.

The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 may also be connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

Enterprise network 20 may include a Service Management Platform (SMP) 18 for performing aspects of messaging or session control, such as call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

For devices such as telephony devices 11, 19 controlled by or otherwise associated with it, enterprise communications platform 14 can implement functions such as switching to connect session legs, and may provide conversion between, for example, a circuit-switched call and a VoIP call, or connect legs of other media sessions. Such calls/sessions may be set up and modified on behalf of devices 11, 19 and any desired telephony devices, within or outside enterprise network 20, including for example devices 19, 107 connected to PSTN 40. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, H.323, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the capabilities of enterprise communications platform 14 is to extend the features of enterprise telephony to mobile device(s) 11. For example, enterprise communications platform 14 may allow mobile device(s) 11 to perform functions akin to those normally available on a standard office telephone, such as the digital telephone set 17 or analog telephone set 15. Example features may include direct extension dialing, enterprise voice mail, conferencing, call transfer, call park, etc. As further described elsewhere herein, enterprise communications platform 14 can further provide functions such as transfer of corresponding ends of existing communications sessions from one or more mobile devices 11 to wired telephony devices 19 associated with platform 14.

Figure 2:
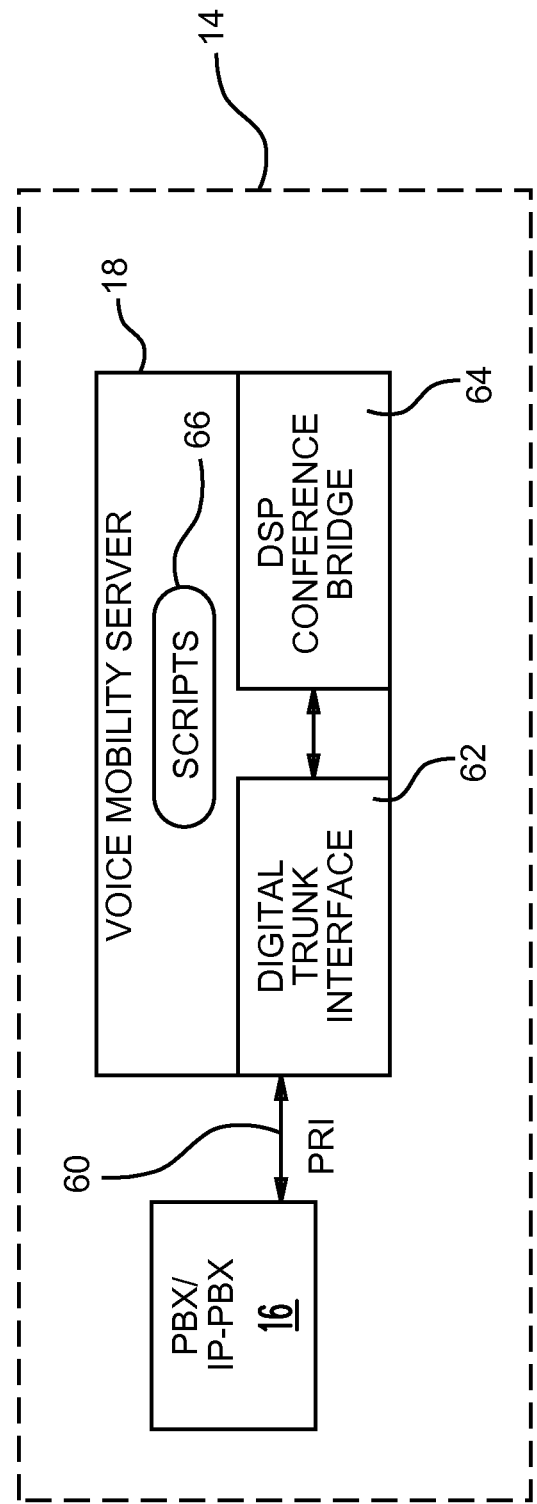
FIGS. 2-4 show schematic diagrams of example embodiments of details of a system such as that shown in FIG. 1.
Figure 3:
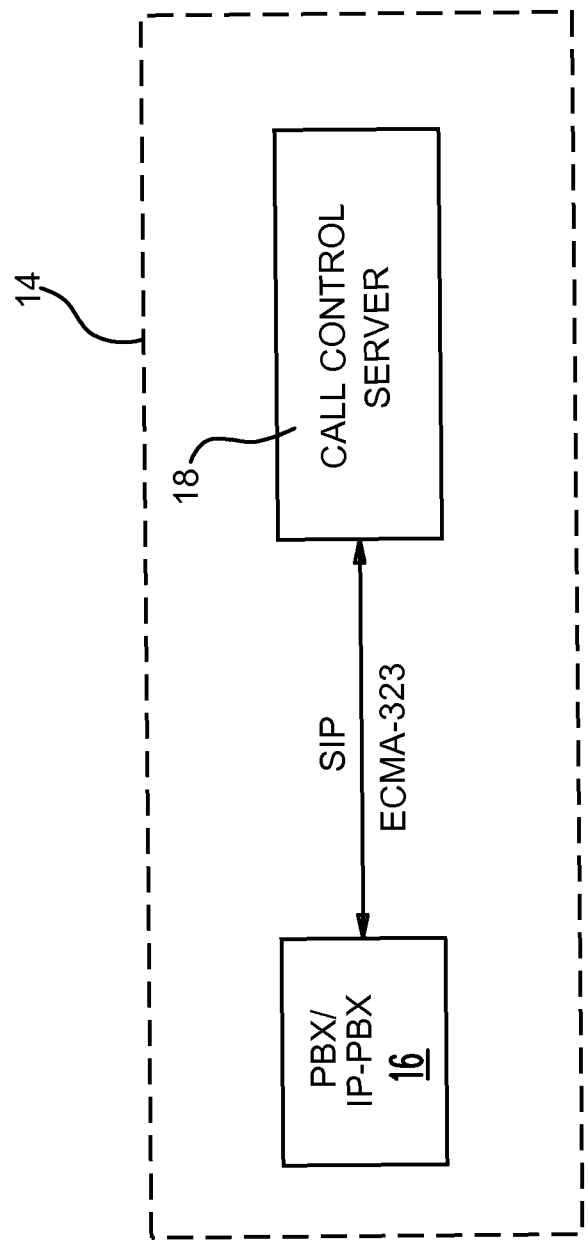
Figure 4:
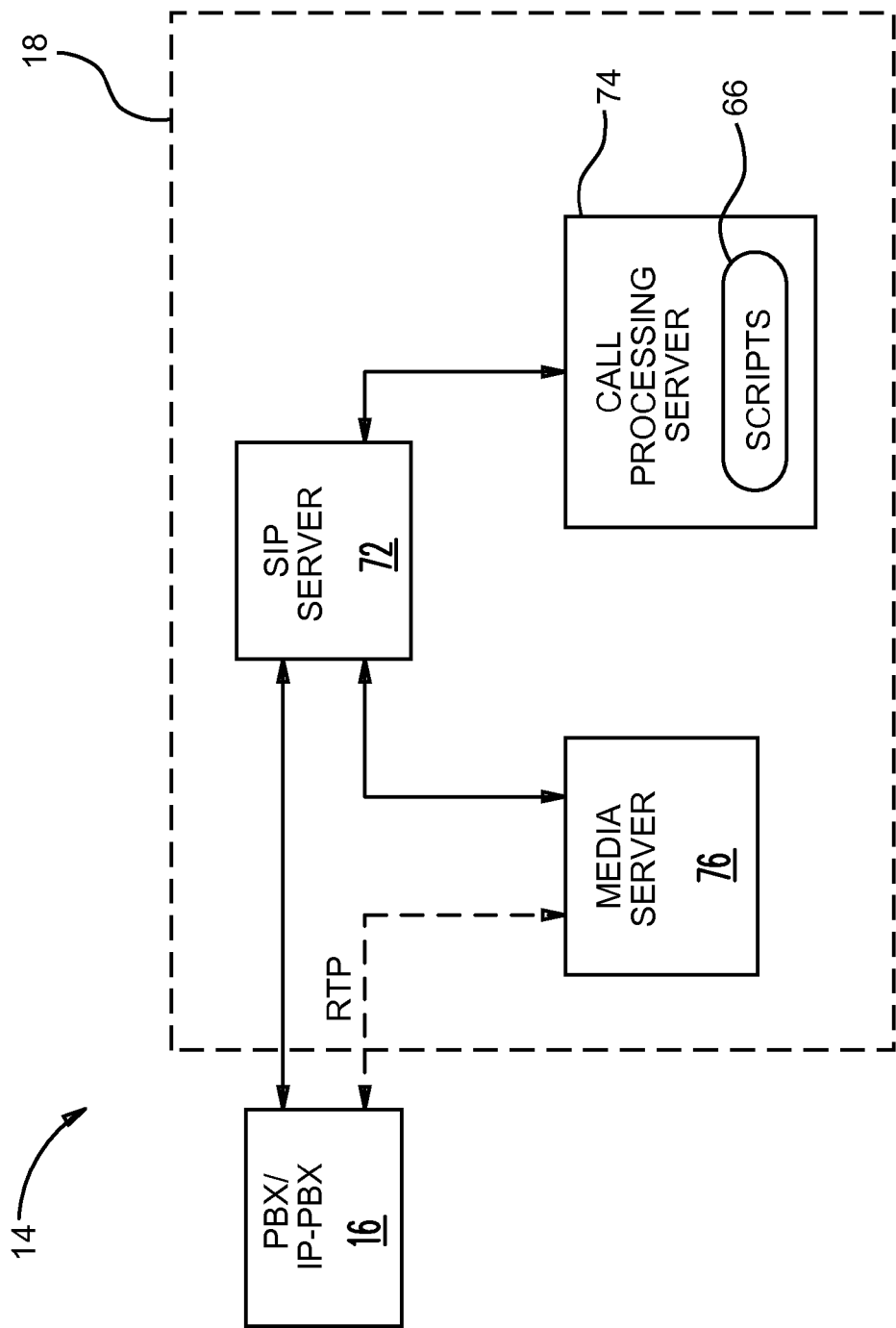

Reference is now made to FIGS. 2 to 4, which show example embodiments of the enterprise communications system 14. Although references are made below to "calls" or call-centric features it will be appreciated that the architectures and systems depicted and described are applicable to session-based (e.g., voice) communications in general and, in some instances, to text, image, or other messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as, but not limited to, conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control" or "3PCC". In the traditional telephony context, third party call control allows one entity, such as call control server 18, to set up and manage a communications relationship or telephone call between two or more other parties. For example, third party call control may be used for operator services (where an operator creates a call that connects two participants together) and conferencing. Similarly, many SIP services are possible through third party call control. These include, for example, services on a PSTN, such as PSTN 40, and other services, such as "click-to-dial." Click-to-dial allows a user to click on a web page to speak to a customer service representative. A web server may then creates a call between the user and a customer service representative. The call can be between two phones, a phone and an IP host, or two IP hosts.

Call control server 18 is coupled to PBX 16, for example through a LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP). In some embodiments, PBX 16 may be used as a media server 76.

Other architectures or configurations for the enterprise communications system 14 will be appreciated by those ordinarily skilled in the art.

Figure 5:
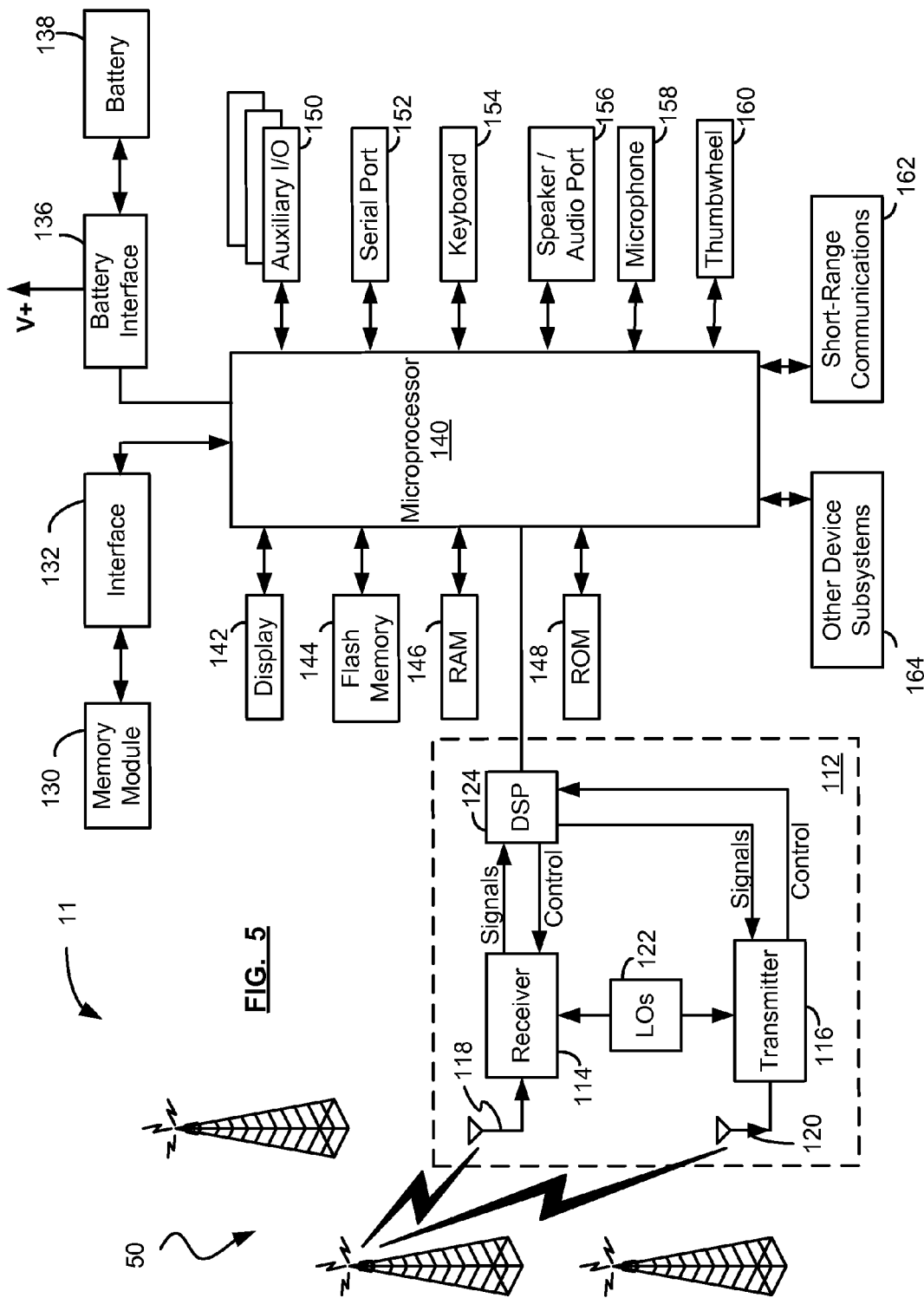
FIG. 5 shows provides a schematic diagram of a wireless handheld telephony device suitable for use in communications in accordance with the disclosure herein.

Reference is now made to FIG. 5, which shows a block diagram illustrating a wireless handheld telephony device 11 suitable for use in the system 10 described above in relation to FIG. 1.

In an example embodiment, the wireless handheld telephony device 11 is a two-way mobile communication device having at least voice and data communication capabilities, including the capability to communicate with other computer systems. Depending on the functionality provided by the wireless handheld telephony device 11, it may be referred to as a data messaging device, a two-way pager, a cellular telephone with data messaging capabilities, a wireless Internet appliance, a data communication device (with or without telephony capabilities), a clamshell device, or a flip-phone. The wireless handheld telephony device 11 may communicate with any one of a plurality of fixed transceiver stations within its geographic coverage area.

A wireless handheld telephony device 11 may incorporate a communication subsystem 112, which includes one or more receivers 114, one or more transmitters 116, and associated components, such as one or more antenna elements 118 and 120, local oscillators (LOs) 122, and a processing module such as a digital signal processor (DSP) 124. In an embodiment, the antenna elements 118 and 120 may be embedded or internal to the wireless handheld telephony device 11. As will be apparent to those skilled in the field of communications, the particular design of the communication subsystem 112 depends on the system(s), such as enterprise network 20, the PLMN 50 and/or the WLANs 32, with which the wireless handheld telephony device 11 is intended to communicate.

Wireless handheld telephony device 11 may, for example, comprise multiple transmitters 116 and receivers 114 for processing various types of wireless communications data, as described herein. For example, a wireless device 11 may comprise one or more transmitters 116 and receivers 114 for processing wireless radio, microwave, and/or optical signals according to any of a wide variety of possible protocols, unknown and hereafter to be developed.

Wireless handheld telephony device 11 may send and receive communication signals to and from the enterprise server 20 through, for example, the PLMN 50 and/or one of the WLANs 32. Signals received by the antenna 118 may be input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access may be controlled or facilitated on the basis of or otherwise associated with individual subscribers or users of wireless handheld telephony device(s) 11 via the use of memory modules, such as a memory module 130, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 132 of the wireless handheld telephony device 11. Alternatively, the wireless handheld telephony device 11 may have an integrated identity module for use with systems such as Code Division Multiple Access (CDMA) systems.

A wireless handheld telephony device 11 may also include a battery interface 136 for receiving one or more rechargeable batteries 138. A battery 138 provides electrical power to at least some of the electrical circuitry in the wireless handheld telephony device 11, and the battery interface 136 provides a mechanical and electrical connection for the battery 138. The battery interface 136 is coupled to a regulator (not shown) which provides power V+ to the circuitry of the wireless handheld telephony device 11.

Wireless handheld telephony device(s) 11 can include one or more microprocessors 140 which control the overall operation of the wireless handheld telephony device 11. Communication functions, including at least data and voice communications, may be performed through the communication subsystem 112. Microprocessor(s) 140 can also interact with additional device subsystems, such as modem(s) 128, primary display(s) 142, optional secondary display(s) 143, flash memory(ies) 144, random access memory(ies) (RAM(s)) 146, read-only memory(ies) (ROM(s)) 148, auxiliary input/output (I/O) subsystems 150, data ports such as Universal Serial Bus (USB) port 152, one or more keyboards and/or keypads 154, speaker(s) or audio port(s) 156 for connecting to, for example headphones or earpieces, microphone(s) 158, clickable thumbwheel(s) 160, open/close sensor(s) 161, short-range communications subsystem(s) 162, and/or any other desirable or suitable device subsystems generally designated as 164.

Some of the subsystems shown in FIG. 5 perform communication-related functions, whereas others may provide "resident" or on-device functions. Notably, for example, some subsystems, such as keypad(s) 154, primary display(s) 142, secondary display(s) 143, and thumbwheel(s) 160, for example, may be used for both communication-related functions, such as displaying notifications or entering a text message for transmission through, for example, the PLMN 50 and/or one of the WLANs 32, and executing device-resident functions such as a clock, a calculator or a task list.

Operating system software used by microprocessor(s) 140 may be stored in persistent memory such as the flash memory 144, which may alternatively include ROM 148 or similar storage element(s). Those skilled in the relevant arts will appreciate that the operating system, specific device applications, or parts thereof, may be temporarily loaded into a volatile store such as the RAM 146.

Microprocessor(s) 140, in addition to its operating system functions, can enable execution of software applications on the wireless handheld telephony device 11. A predetermined set of applications that control basic device operations, including data and voice communication applications, will normally be installed on the wireless handheld telephony device 11 during or after manufacture. The wireless handheld telephony device 11 may include a personal information manager (PIM) application having the ability to organize and manage data items relating to a user such as, but not limited to, instant messaging, email, calendar events, voice mails, appointments, and task items. One or more memory stores may be available on the wireless handheld telephony device 11 to facilitate storage of information, such as the flash memory 144, the RAM 146, the ROM 148, the memory module 130, or other types of memory storage devices or FLASH memory cards represented by the other device subsystems 164, such as Secure Digital (SD) cards or mini SD cards, etc.

PIM and/or media applications have the ability to send and receive data items via the PLMN 50 and/or one of the WLANs 32 or via a link to a computer system. The link to the computer system may be via the serial port 152 or the short-range communications subsystem 162. In an embodiment, PIM and/or media data items are seamlessly combined, synchronized, and updated, for example, through the PLMN 50 and/or one of the WLANs 32, with the wireless handheld telephony device user's corresponding data items stored and/or associated with a host computer system thereby creating a mirrored or partially mirrored host computer on the wireless handheld telephony device 11 with respect to such items. This may be advantageous where the host computer system is the wireless handheld telephony device user's office computer system. Additional applications may also be loaded onto the wireless handheld telephony device 11 through, for example, the PLMN 50 and/or one of the WLANs 32, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless handheld telephony device 11 and may provide enhanced on-device functions, communication-related functions, or both. For example, secure communication applications may enable electronic commerce functions and other such financial transactions to be performed using the wireless handheld telephony device 11.

In a data communication mode, a received data signal representing information such as a text message, an email message, a media file to be transferred, or Web page download will be processed by the communication subsystem 112 and input to the microprocessor(s) 140. The microprocessor(s) 140 will further process the signal for output to the primary display 142, secondary display 143, or alternatively to the auxiliary I/O device 150. A user of the wireless handheld telephony device 11 may also compose data items, such as email messages, for example, using the keypad 154 and/or the clickable thumbwheel 160 in conjunction with the primary display 142 and possibly the auxiliary I/O device 150. The keypad 154 maybe either a complete alphanumeric keypad or telephone-type keypad. These composed items may be transmitted through the communication subsystem 112 or via the short range communication subsystem 162.

For voice communications, the overall operation of a wireless handheld telephony device 11 can be similar, except that the received signals are typically output to the speaker(s) or audio port(s) 156 and signals for transmission are generated by a transducer such as the microphone 158. Alternative voice or audio I/O subsystems, such as a voice message recording subsystem, may also be implemented on the wireless handheld telephony device 11. Although voice or audio signal output is typically accomplished primarily through the speaker or audio port 156, the primary display 142 or the secondary display 143 may also be used to provide an indication of the identity of a calling party or the communication type, duration of a voice call, or other voice call related information. Stereo headphones or an earpiece may also be used in place of the speaker 156. Call control functions and audio or other content processing may, as noted herein, be executed using the same or separate communications paths, or channels, which may comprise, for example, the sending of different types of data signals on different frequencies, or otherwise according to differing protocols.

USB port 152 is normally implemented in a personal digital assistant (PDA) type communication device for which synchronization with a user's computer is a desirable, albeit optional, component. The USB port 152 enables a user to set preferences through an external device or software application and extends the capabilities of the wireless handheld telephony device 11 by providing for information or software downloads to the wireless handheld telephony device 11 other than through the PLMN 50 and/or one of the WLANs 32. The alternate download path may, for example, be used to load software or data files onto the wireless handheld telephony device 11 through a direct, reliable and trusted connection.

Short-range communications subsystem 162 is an additional optional component which provides for communication between the wireless handheld telephony device 11 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as one or more of 802.11b, 802.11g, and/or 802.11n.

Figure 6:
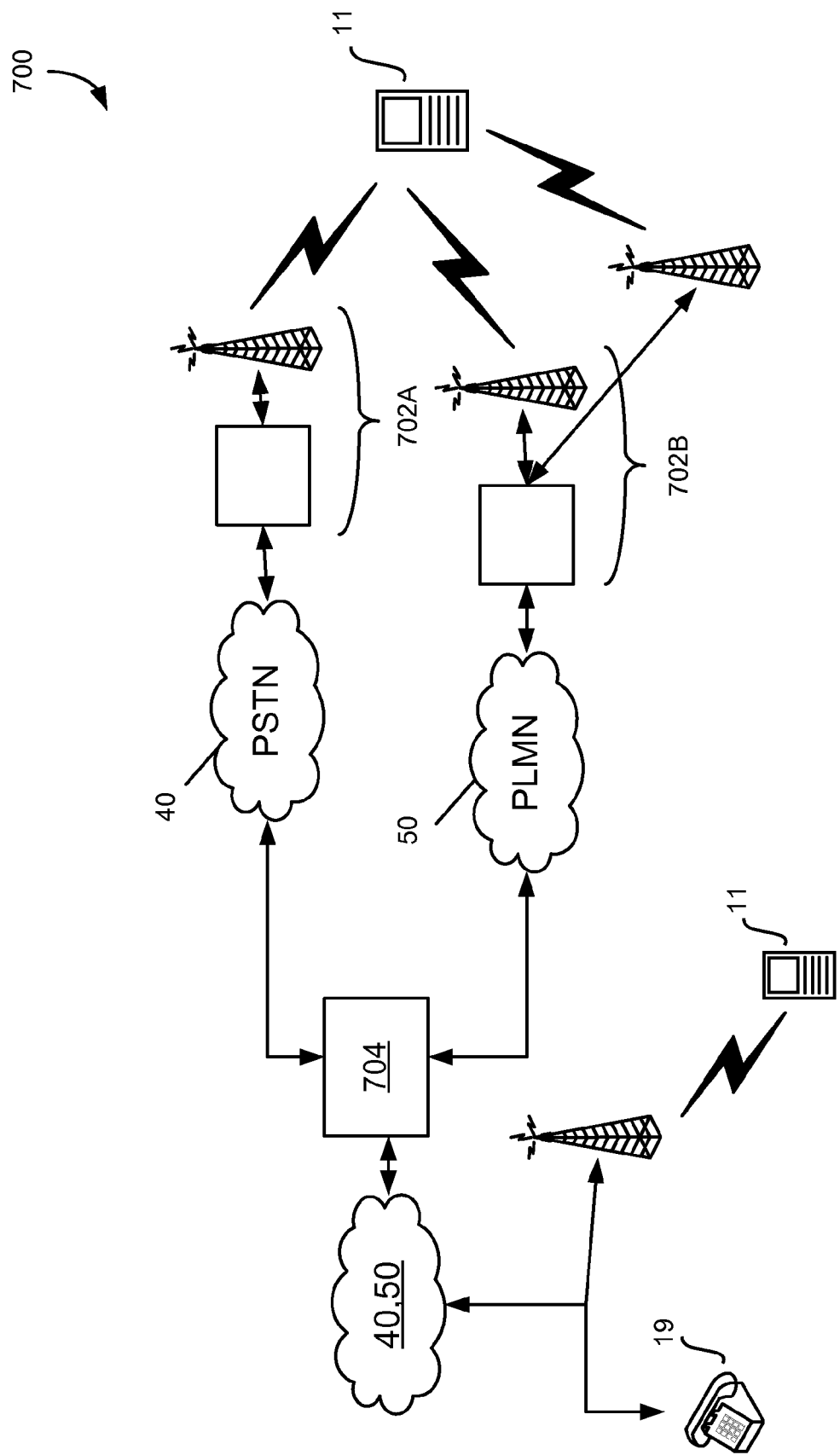
FIG. 6 shows a schematic diagram of an example system for managing telephone and other communications in accordance with the disclosure herein.

Reference will now be made to FIG. 6 which shows, in block diagram form, an example system 700 for managing wireless telephony communications. In the example shown, system 700 comprises a wireless handheld telephony device 11 which may be engaged in an established or ongoing communication session with any one or more other telephony devices, such as any of devices 11, 19, of FIG. 1, via one or more wireless communication systems 702A, 702B and one or more of networks 20, 40, 50 of FIG. 1. A call control server 704, which may for example include components such as PBX 16, SMP 18, and/or enterprise server 12 of FIG. 1, may be employed to facilitate and control the communication session by, for example, controlling call set-up and other functions for device 11. Call control server 704 may, for example, form a part of an enterprise server 10 of FIG. 1; for example, the call control server 704 may be the same as the call control server 18 of FIG. 3.

In some embodiments, PBX 16 may be connect to PSTN 40 by means of a PSTN GW if PBX 16 does not natively support PSTN functionality.

A plurality of wireless communication systems 702A and 702B may use various wireless technologies and/or form parts of different wireless networks. For example, the two wireless communication systems 702A and 702B may be parts of or otherwise associated with different PLMNs 50. As such, wireless communication systems 702A and 702B may provide different capabilities and impose different requirements, such as those supported or imposed by different communication protocols. For example, a wireless communication system 702A may support one or more dual path protocols, such as protocols using DTMF or other sound- or tone-based signaling, whereas a second wireless communication system 702B may only support single path protocols.

Moreover, a single wireless system 702A, 702B may comprise multiple signal towers, one or more of which provide different functionalities. For example, a single wireless system 702A, 702B may comprise towers which support dual-band communications and individual towers which do not provide dual-band facilities.

While only two wireless communication systems 702A, 702B are shown, each with a single tower, it will be understood by those skilled in the art that the system 700 may include any numbers of communication systems 702 each comprising any number of towers.

In either setting up or maintaining an ongoing call session, a wireless handheld telephony device 11 and/or call control server 704 will typically communicate with a single one of wireless communications systems 702A, 702B at a time. The system 702A, 702B to be utilized may be established according to pre-defined criteria. For example, the wireless handheld telephony device 11 may communicate using a wireless communication system 702A, 702B which has a tower closest to it or which otherwise provides a strongest wireless signal path, or which currently has the lightest load within a certain proximity. In some situations, the wireless handheld telephony device 11 may switch from one wireless communication system 702A, 702B to another wireless communication system 702A, 702B during an ongoing communication session. This may occur, for example, when the wireless handheld communication device 11 moves out of effective proximity of one wireless communication system 702A, 702B and into the proximity of a different wireless communication system 702A, 702B.

As mentioned above, some wireless communication systems 702A, 702B may not support dual path communication. If a leg of an ongoing communication session associated with a device 11 is transferred to such a system from a system which supports dual path communication, a data path between the call control server 704 controlling device 11's call and the wireless handheld telephony device 11 may cease to be available. Without a data path, data representing control and other types of messages to be transmitted to and from the wireless handheld telephony device 11, such as, for example, in-call feature execution instruction, must be transmitted by some other means, if the ongoing call session is to be maintained and/or such features are to be enabled. Thus, in accordance with this disclosure, when an out-of-band path is not available, the system 700 may use an in-band communication method, such as dual-tone multi-frequency (DTMF) signalling, to provide a communication channel between the call control server 704 and the wireless handheld telephony device 11 while a voice communication session is in progress.

DTMF signaling is a type of in-band signaling which may be used for telecommunication signaling over communication lines, including analog telephone lines, in the voice-frequency band between telephony devices, such as the wireless handheld telephony device 11, and other systems, such as the call control server 704. In some embodiments, the DTMF system may use a plurality, such as eight, different frequency signals which may be transmitted in pairs to represent, for example, sixteen different numbers, symbols and/or letters. These signals or pairs of signals can be combined to transmit data such as control messages. Other examples of types of in-band communication include modem signals, SMS messages and SMS/USSD messages.

Similarly, if an out-of-band path is unavailable but becomes available during a communication session (for example when the handheld telephony device 11 moves from effective proximity of a wireless communication system 702A, 702B that does not support dual path communication, and into the proximity of a different wireless communication system 702A, 702B that does support dual path communication), the system 700 may switch (or switch back) to using the out-of-band path for data sent between the wireless handheld telephony device 11 and the call control server 704.

The switch between in-band and out-of-band communication, or vice-versa, can be coordinated as described herein.

Figure 7:
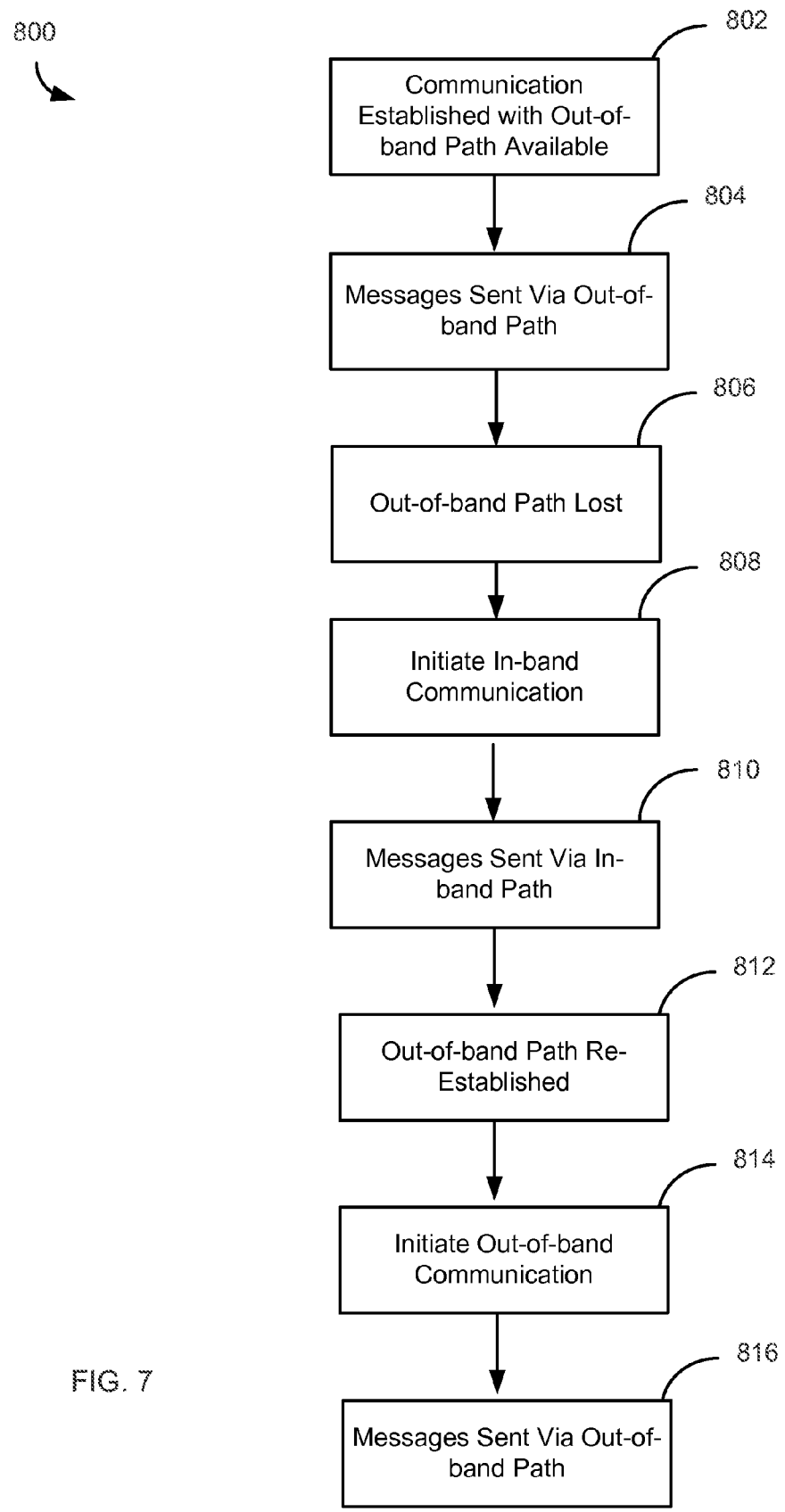
FIG. 7 shows a schematic flow diagram of an example of a method of alternating between an in-band and out-of-band communication path during a communication session according to an embodiment.

Reference is next made to FIG. 7, which shows a flow diagram representing an example of a method 800 for alternating between an in-band and an out-of-band communication path for communications between a call control server 704 and a wireless handheld telephony device 11 engaged in an ongoing communication session. Method 800 is suitable for use, for example, in conjunction with systems 10, 700 of FIGS. 1 and/or 6 and wireless handheld telephony device 11 of FIG. 5 in implementing the disclosure herein.

A method 800 in accordance with this aspect of the disclosure can be considered to begin at 802 where a voice communication has previously been established between a wireless handheld telephony device 11 and another telephony device through a first wireless communication system 702A, which supports dual band communication. Thus, an out-of-band path (e.g. data path) is available between the wireless handheld telephony device 11 and the call control server 704 for transmitting signals for call control functions, etc.

Since an out-of-band path is available, at 804, signals representing control and other data messages between the call control server 704 and the wireless handheld telephony device 11 may be sent using an out-of-band path through the first wireless communication system 702A. Such messages may, for example, include control messages sent by the call control server 704 to the wireless handheld telephony device 11 or vice versa.

At 806, the out-of-band path is lost between the call control server 704 and the wireless handheld telephony device 11. As explained above, this may occur, for example, where the communication session between the wireless handheld telephony device 11 and at least one second telephony device has been transferred from a first wireless communication system 702A, which supports dual band communication, to a second wireless communication system 702B, through which dual band communication is not available. When the out-of-band path has been lost, an in-band path may be used to send messages between the call control servers 704 and the wireless handheld telephony device 11 through the second wireless communication system 702B. This may be done, for example, using DTMF signaling. The wireless handheld telephony device 11 may immediately, or almost immediately, determine or be aware that the out-of-band path has been lost at 806. This may be because the wireless handheld telephony device 11 may be in direct contact with the wireless communication system 702A, 702B. For example, in some embodiments, the wireless handheld telephony device 11 may constantly monitor a status of the wireless connection to a cellular network and, once the connection or some of the services on the connection become unavailable, the device may report this failure to the upper application layers of the wireless handheld telephony device 11, thus determining the loss of the out-of-band path.

It is possible for a call control server 704 to determine when an out-of-band path has been lost by, for example, monitoring the out-of-band path through the wireless communication system 702A, 702B. For example, the call control server 704 can periodically send test data messages, such as "heartbeat" or "ping" messages, on the out-of-band path and wait for a response. If a response were not received within a certain period of time, the call control server 704 could assume that the out-of-band path is no longer available. However, this could be unreasonably complicated, expensive, resource intensive and/or unreliable. It may be faster, cheaper, more reliable, or otherwise more efficient for the wireless handheld telephony device 11 to monitor the out-of-band path connection and inform the call control server 704 when the out-of-band path has been lost (e.g., by sending signals indicating that the out-of-band path is not available or by initiating in-band communication as described below).

Upon determination that an out-of-band path has been lost, at 808 the use of the in-band communication path between the call control server 704 and the wireless handheld telephony device 11 may be initiated. In-band communication may be initiated by the wireless handheld telephony device 11 by, for example, sending an in-band initiation signal to the call control server 704 through the second wireless communication system 702B to indicate that the out-of-band path has been lost. This initiation signal may be sent using in-band communication such as, for example, DTMF signaling. In some embodiments, an initiation signal or signal set may be prefixed with a specific signal to distinguish it. For example, an initiation signal comprising DTMF tones may be prefixed with, for example, a tone normally associated with activation of a "#" or other designated key on a standard telephony keyboard to distinguish it from regular DTMF tones. Once the call control server 704 has received the initiation signal from the wireless handheld telephony device 11, at 810, any future control messages between the call control server 704 and the wireless handheld telephony device 11 may be sent using in-band communications methods, such as the DTMF signaling.

At 812, use of an out-of-band communication path may be re-established. This may occur, for example, where the leg of a communications session associated with the wireless handheld telephony device 11 is transferred from a second wireless communication system 702B which does not support dual band communication to a third wireless communication system (not shown) which does support dual band communication (note that the third wireless communication tower may or may not be the same as the first wireless communication system 702A). As explained above, since the wireless handheld telephony device 11 may be continually attempt to establish direct data communication with the wireless communication system 702A, 702B, it may immediately, or almost immediately, determine (e.g., based on received signals indicating that the out-of-band path is available) or be aware that an out-of-band communication path is available, and may so inform the corresponding call control server 704. The call control server 704, as explained above, may not otherwise receive any other information or be aware that the out-of-band path has been re-established.

At 814, use of an out-of-band communication path between the call control server 704 and the wireless handheld telephony device 11 for control and other data messages may be re-initiated. Out-of-band communication may be re-initiated by the wireless handheld telephony device 11 by sending an in-band or out-of-band initiation signal to the call control server 704 through the wireless communication system 702B to indicate that the out-of-band path has been re-established. Once the call control server 704 has received the initiation signal from the wireless handheld telephony device 11, at 816, any future data messages between the call control server 704 and the wireless handheld telephony device 11 may be sent using the out-of-band communications path.

While the steps of method 800 are shown as occurring in a particular order, it will be appreciated by those skilled in the relevant arts that many of the process steps, and portions thereof, are interchangeable and may occur in different orders that that shown without materially affecting the end results of the method 800. It will further be appreciated by such persons that not all of such steps are required in order to accomplish the purposes disclosed herein, and that further steps may be optionally implemented. For example, although the method 800 describes an out-of-band path being first available, then unavailable, and then available again, it should be understood that certain steps of the method 800 may be omitted or repeated or reordered in the example case where the out-of-band path is initially unavailable, then available, and then unavailable again. Other such variations are possible where the out-of-band path alternates between being available and being unavailable.

Figure 8:
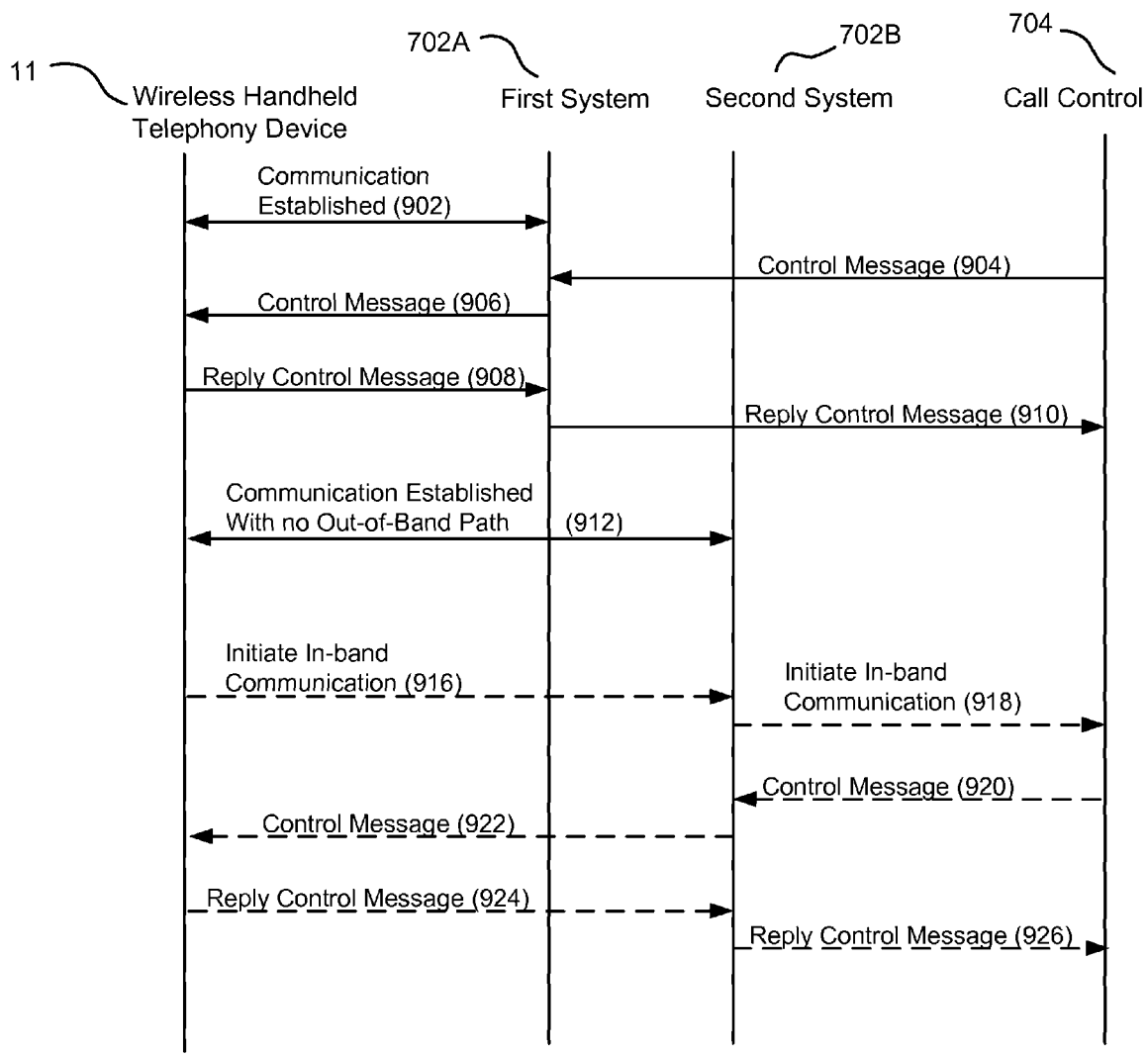
FIG. 8 shows a schematic flow diagram of an example of a method of alternating between an in-band and out-of-band communication path during a communication session according to an embodiment.

Reference is now made to FIG. 8, which shows an example of command signal interchange operations of a system 10, 700 in alternating between an in-band and out-of-band communication path for communications between a call control server 704 and a wireless handheld telephony device 11 engaged in an ongoing communication session. In FIG. 8, signals sent via in-band communication (e.g. an audio path) are depicted using dashed lines and signals via out-of-band path (e.g. a data path) are depicted using solid lines.

At 902, a communication session is established between the wireless handheld telephony device 11 and at least one second telephony device through a first wireless communication system 702A which supports dual band communication such that an out-of-band path (e.g. data path) is available between the wireless handheld telephony device 11 and the call control server 704.

At 904, signals representing a data message, such as a call control message, is sent from the call control server 704 to the first wireless communication system 702A. The message is relayed to the wireless handheld telephony device 11 at 906. This message may, for example, indicate that an incoming communication has been received for the wireless handheld telephony device 11.

At 908, signals representing a data message are sent from the wireless handheld telephony device 11 to the first wireless communication system 702A. The data message may, for example, comprise a control message which is in reply to the control message which was sent to the wireless handheld telephony device 11 at 906. For example, the reply control message sent at 908 may be an indication of whether the user of the wireless handheld telephony device 11 is willing to accept an incoming communication. At 910, the first wireless communication system 702A relays the reply control message to the call control server 704. Since an out-of-band communication path is now available, the control message and reply control messages are sent via the out-of-band communication path.

At 912, the ongoing communication session between the wireless handheld telephony device 11 and the at least one second telephony device is transferred to a second wireless system 702B which does not support dual band communication. In other words, the out-of-band communication path is no longer available. The switch between the first wireless communication system 702A and the second wireless communication system 702B may occur, for example, where the wireless device moves into the proximity of the second wireless communication system 702B and out of the proximity of the first wireless communication system 702A. Systems and methods for facilitating such a switch between wireless communication towers are well known in the art.

Signals indicating that the out-of-band path is unavailable may be generated and received within the handheld telephone device 11 when the out-of-band communication path is unavailable. The unavailability of the out-of-band communication path may be determined by the handheld telephony device 11, for example based on monitoring a status of the wireless connection to a cellular network. When the connection or some of the services on the connection is detected to be unavailable, a signal indicating this failure may be sent to the upper application layers of the wireless handheld telephony device 11.

In some embodiments, in response to the determination that the out-of-band communication path is unavailable, at 916 the wireless handheld communication device 11 sends an in-band signal to the call control server 704 through the second wireless communication system 702B indicating that the out-of-band communication path has been lost. This signal may include an initiation signal for an in-band communication. This signal is relayed by the second wireless communication system 702B to the call control server 704 at 918. The signal may be sent using an in-band communication method such as DTMF signaling. Data messages between the call control server 704 and the wireless handheld telephony device 11 will then be sent using an in-band path, such as the audio communication path.

At 920, a data message, such as a call control message, is sent from the call control server 704 to the second wireless communication system 702B to be relayed at 922 to the wireless handheld telephony device 11. Again, this message may, for example, be a call control message such as a message indicating the second incoming communication has been received for the wireless communication telephony device 11. At 924, a data message, such as a reply control message, is sent from the wireless handheld telephony device 11 to the second wireless communication system 702B using an in-band communication path. At 926, the reply control message is relayed from the second wireless communication system 702B to the call control server 704. The reply control message may comprise signals which may, for example, indicate that the user of the wireless handheld telephony device 11 wishes to accept an incoming communication.

It should be understood that the signal interchange operations of FIG. 8 may be varied in the case where the out-of-band communication path is first unavailable, then available.

While the invention has been described and illustrated in connection with specific, presently-preferred embodiments, many variations and modifications may be made without departing from the spirit and scope of the invention. The invention is therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the claims is to be defined solely by the appended claims, giving due consideration to the doctrine of equivalents and related doctrines.

What is claimed is:

1. A wireless handheld telephony device comprising at least one wireless signal receiver, at least one wireless signal transmitter, and at least one data processor configured to send and receive wireless signals representing control messages to and from a call control server during an ongoing communication session between the wireless handheld telephony device and a second telephony device, by:

when an in-band path for communication of the wireless signals representing control messages has been established between the wireless handheld telephony device and the call control server for the ongoing communication session, in response to a determination that an out-of-band path to the call control server has become available:

sending the wireless signals representing control messages through the at least one wireless signal transmitter to the call control server using the out-of-band path; and receiving the wireless signals representing control messages through the at least one wireless signal receiver from the call control server using the out-of-band path;

when the out-of-band path for communication of the wireless signals representing control messages has been established between the wireless handheld telephony device and the call control server for the ongoing communication session, in response to a determination that the out-of-band path to the call control server has become unavailable:

initiating in-band communication with the call control server using the in-band path;

sending the wireless signals representing control messages through the at least one wireless signal transmitter to the call control server using the in-band path; and receiving the wireless signals representing control messages through the at least one wireless signal receiver from the call control server using the in-band path.

2. The wireless handheld telephony device of claim 1, wherein the out-of-band path is a data path.

3. The wireless handheld telephony device of claim 1, wherein the in-band path is a voice path.

4. The wireless handheld telephony device of claim 3, wherein the wireless signals sent and received using the in-band path comprise dual-tone multi-frequency (DTMF) tones.

5. The wireless handheld telephony device of claim 1, wherein initiating in-band communication with the call control server comprises sending an in-band initiation message to the call control server indicating that the out-of-band path has become unavailable.

6. The wireless handheld telephony device of claim 1, wherein the device is further adapted to, in response to a determination that the out-of-band path which had become unavailable is again available, initiating out-of-band communication with the call control server.

7. The wireless handheld telephony device of claim 6, wherein initiating out-of-band communication with the call control server comprises sending an out-of-band initiation message to the call control server indicating that the out-of-band path has become available.

8. A method of enabling a wireless handheld telephony device to send and receive wireless signals representing control messages to and from a call control server during an ongoing communication session between the wireless handheld telephony device and a second telephony device, the wireless handheld telephony device comprising at least one wireless signal receiver, at least one wireless signal transmitter, at least one data processor, and media readable by the at least one data processor comprising coded program instructions, the method comprising:

when an in-band path for communication of the wireless signals representing control messages has been established between the wireless handheld telephony device and the call control server for the ongoing communication session, in response to a determination that an out-of-band path to the call control server has become available:

sending the wireless signals representing control messages through the at least one wireless signal transmitter to the call control server using the out-of-band path; and receiving the wireless signals representing control messages through the at least one wireless signal receiver from the call control server using the out-of-band path;

when the out-of-band path for communication of the wireless signals representing control messages has been established between the wireless handheld telephony device and the call control server for the ongoing communication session, in response to a determination that the out-of-band path to the call control server has become unavailable:

initiating in-band communication with the call control server using the in-band path;

sending the wireless signals representing control messages through the at least one wireless signal transmitter to the call control server using the in-band path; and receiving the wireless signals representing control messages through the at least one wireless signal receiver from the call control server using the in-band path.

9. The method of claim 8, wherein the out-of-band path is a data path.

10. The method of claim 8, wherein the in-band path is a voice path.

11. The method of claim 10, wherein the wireless signals sent and received using the in-band path comprise dual-tone multi-frequency (DTMF) tones.

12. The method of claim 8, wherein initiating in-band communication with the call control server comprises sending an in-band initiation message to the call control server indicating that the out-of-band path has become unavailable.

13. The method of claim 8, further comprising, in response to a determination that the out-of-band path which had become unavailable is again available, initiating out-of-band communication with the call control server.

14. The method of claim 13, wherein initiating out-of-band communication with the call control server comprises sending an out-of-band initiation message to the call control server indicating that the out-of-band path has become available.

15. A system configured to enable wireless signals representing control messages to be sent and received from a wireless handheld telephony device during an ongoing communication session between the wireless handheld telephony device and a second telephony device, the system comprising:

a data processor, media readable by the data processor, and a communications subsystem;

the communications subsystem adapted to process signals representing communications by and between the wireless handheld telephony device, the second telephony device, and the processor; and the media readable by the data processor comprising coded program instructions adapted to cause the processor to:

when an in-band path for communication of the wireless signals representing control messages has been established between the wireless handheld telephony device and the call control server for the ongoing communication session, and when an out-of-band path to the wireless handheld telephony device has become available:
send the wireless signals representing control messages through the at least one wireless signal transmitter to the wireless handheld telephony device using the out-of-band path; and
receive the wireless signals representing control messages through the at least one wireless signal receiver from the wireless handheld telephony device using the out-of-band path;
when the out-of-band path for the communication of the wireless signals representing control messages has been established between the wireless handheld telephony device and the call control server for the ongoing communication session, and when the out-of-band path to the wireless handheld telephony device has become unavailable:
receive an initiation signal from the wireless handheld telephony device indicating that the out-of-band path is unavailable;
send the wireless signals representing control messages through the at least one wireless signal transmitter to the wireless handheld telephony device using the in-band path; and
receive the wireless signals representing control messages through the at least one wireless signal receiver from the wireless handheld telephony device using the in-band path.

16. The system of claim 15, wherein the out-of-band path is a data path.

17. The system of claim 15, wherein the in-band path is a voice path.

18. The system of claim 17, wherein the wireless signals sent and received using the in-band path comprise dual-tone multi-frequency (DTMF) tones.

19. The system of claim 15, wherein the system is further adapted to, when the out-of-band path which had become unavailable is again available, receive an initiation signal from the wireless handheld telephony device indicating that the out-of-band path is available.

* * * * *